(12) United States Patent
Ren

(10) Patent No.: US 8,830,936 B2
(45) Date of Patent: Sep. 9, 2014

(54) ALLOCATING CONTROL CHANNEL ELEMENTS TO DOWNLINK CONTROL CHANNELS

(75) Inventor: Hong Ren, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 230 days.

(21) Appl. No.: 13/367,879

(22) Filed: Feb. 7, 2012

(65) Prior Publication Data

US 2013/0201923 A1 Aug. 8, 2013

(51) Int. Cl.
*H04W 4/00* (2009.01)
*H04W 72/04* (2009.01)

(52) U.S. Cl.
USPC ............ 370/329; 370/328; 370/252; 370/344

(58) Field of Classification Search
CPC ............ H04W 72/04; H04W 72/0453; H04W 72/0406; H04W 88/08
USPC .......... 370/329, 252, 328, 344, 330; 455/450, 455/509, 434, 449, 425
See application file for complete search history.

(56) References Cited

U.S. PATENT DOCUMENTS

| 8,208,438 | B2* | 6/2012 | Han et al. ...................... 370/330 |
| 2010/0260124 | A1* | 10/2010 | Noshio et al. ................. 370/329 |
| 2011/0267967 | A1* | 11/2011 | Ratasuk et al. ............... 370/252 |
| 2011/0299490 | A1* | 12/2011 | Nordstrom et al. ........... 370/329 |

FOREIGN PATENT DOCUMENTS

CN 101820669 A 9/2010

OTHER PUBLICATIONS

Hosein, Patrick, "Resource Allocation for the LTE Physical Downlink Control Channel", 2009 IEEE, pp. 1-5.
Chen, Yonghui, "Resource Allocation for Downlink Control Channel in LTE Systems", 2011 IEEE, pp. 1-4.
Yan, Yuan, "Enhanced Downlink Control Channel Resource Allocation Algorithm for Cross-Carrier Scheduling in LTE-Advanced Carrier Aggregation System", 2011 IEEE, pp. 1-5.
Li, Li, Multi-User Resource Allocation for Downlink Control Channel in LTE Systems, Beijing, China, 2010 IEEE, pp. 1-5.
Balamurali, Optimal Downlink Control Channel Resource Allocation for LTE System, India, 2010 IEEE, pp. 1-5.
PCTIB2013050765 International Search Report.

* cited by examiner

*Primary Examiner* — Rasheed Gidado
(74) *Attorney, Agent, or Firm* — Jean-Pierre Fortin; Ericsson Canada Inc.

(57) ABSTRACT

A method and apparatus is provided for allocating shared control channel resources. The control channel elements (CCEs) are allocated in units referred to as CCE sets. Each CCE set includes one or more control channel elements. Early commitment of control channel elements in a CCE set to a specific scheduling entity is avoided in situations where two or more candidate sets are available for the scheduling entity. In this case, the CCEs belonging to the candidate sets are designated as an alternate resource for a first scheduling entity. A CCE designated as an alternate may be allocated to another scheduling entity as long as such allocation does not block the first scheduling entity.

20 Claims, 15 Drawing Sheets

FIG. 8

|  | SET 1 |  |  |  | SET 2 |  |  |
|---|---|---|---|---|---|---|---|
| ALT | ALT | ALT | ALT | ALT | ALT | ALT | ALT |
| 0 | 1 | 2 | 3 | 4 | 5 | 6 | 7 |

FIG. 13A

|  | SET 1 |  |  |  | SET 2 |  |  |
|---|---|---|---|---|---|---|---|
| X | X | X | X | O | O | O | O |
| 0 | 1 | 2 | 3 | 4 | 5 | 6 | 7 |

FIG. 13B

|  | SET 1 |  |  |  | SET 2 |  |  |
|---|---|---|---|---|---|---|---|
| ALT | ALT | ALT | ALT | ALT | ALT | ALT | ALT |
| 0 | 1 | 2 | 3 | 4 | 5 | 6 | 7 |

FIG. 13C

ALLOCATING CONTROL CHANNEL ELEMENTS TO DOWNLINK CONTROL CHANNELS

TECHNICAL FIELD

The present invention relates generally to the transmission of control information for a shared downlink channel and, more particularly, to allocation of shared control channel resources for sending the control information.

BACKGROUND

The physical downlink shared channel (PDSCH) and the physical uplink shared channel (PUSCH) in Long Term Evolution (LTE) systems are time and frequency multiplexed channels shared by a plurality of user terminals. User terminals periodically send channel quality indication (CQI) reports to a base station. The CQI reports indicate the instantaneous channel conditions as seen by the receivers in the user terminals. During each one millisecond subframe interval, commonly referred to as a transmission time interval (TTI), a scheduler at the base station schedules one or more user terminals to receive data on the PDSCH or to transmit data on the PUSCH, and determines the transmission format for the downlink/uplink transmissions. The identity of the user terminals scheduled to receive/transmit data in a given time interval and the transmission format, are transmitted to the user terminals on the physical downlink control channel (PDCCH) in a traffic channel assignment message.

In many circumstances, multiple downlink transmissions may be scheduled in a single TTI. For example, in Voice Over IP (VOIP) applications, it is desirable to schedule multiple VOIP users in the same TTI in order to increase the number of VIIP users that can be supported by the cell. Also, in data applications, a single user may have a limited amount of data to send in a TTI. If only a single user is scheduled during a TTI, there will be many instances where the resources are not fully used. Allowing multiple users to receive/transmit data during the same TTI avoids the unnecessary wasting of radio resources.

Allowing multiple users to be scheduled in the same TTI enables the base station to take advantage of multi-user diversity to increase system capacity. In the case of a frequency selected channel, the channel conditions as seen by the receivers will vary in the frequency domain. A first set of sub-bands may be best for a first user, while a second set of sub-bands is best for a second user. System capacity is increased by assigning, to each user, the sub-bands that are the best for that user.

When multiple users are scheduled in the same TTI, the base station needs to send multiple assignment messages. As noted above, the assignment messages are transmitted on the PDCCH. In LTE, a certain number of orthogonal frequency division multiplexing (OFDM) symbols is reserved for the PDCCH. The PDCCH comprises a plurality of control channel elements (CCEs), which are consecutively numbered. When a user is scheduled, the base station selects a CCE set from a group of candidate sets to send the assignment message to the user terminal. The number of CCEs in the set, referred to as the aggregation level, may vary, depending on the channel conditions and the amount of information that needs to be transmitted. Thus, a CCE set may comprise one, two, four, or eight CCEs. For a given user terminal at certain TTI, the locations or the indexes of the CCEs belonging to the group of candidate sets are specified by 3GPP standards. Some CCEs in the group of candidate sets for one user terminal may overlap with CCEs in the group of candidate sets for another user terminal.

When allocating CCEs to the PDCCHs of the user terminals, the typical approach is to assign CCEs to the user terminals in order of scheduling priority, beginning with the user terminal having the highest scheduling priority. This priority based scheduling approach can lead to low PDCCH capacity. During the allocation process, the available CCEs for the PDCCHs are consecutively numbered. The CCEs are allocated in blocks, depending on the aggregation level for the user terminals. For example, a user terminal with an aggregation level of eight will be assigned a CCE set comprising eight contiguous CCEs. Because the PDCCHs of the user terminals are constrained to start on certain CCEs, a user terminal can be blocked if every possible CCE candidate set contains at least one CCE that has been previously allocated to another user terminal. Blocking of a PDCCH can occur even though there is a sufficient number of available CCEs.

Another problem with the priority based allocation is priority inversion. Due to blocking situations, resources may be allocated to the PDCCH for a lower priority user while a higher priority user is blocked. Priority inversion may occur when the higher priority user requires a higher aggregation level than the lower priority user.

The priority based allocation approach may also result in unnecessary intercell interference. In situations where less than all of the available CCEs are needed for the PDCCHs, intercell interference can be reduced in synchronized networks by aligning the unused CCEs in one cell with the used CCEs in an adjacent cell. The priority based resource allocation approach does not consider alternative allocations that might reduce interference with adjacent cells.

A simple way to increase PDCCH capacity is to reserve more OFDM symbols for the PDCCH. More OFDM symbols, however, would increase the signaling overhead and reduce the number of OFDM symbols available for transmission of data.

SUMMARY

The present invention provides methods and apparatus for allocating control channel resources, e.g., CCEs, to the PDCCHs of the scheduled user terminals. In exemplary embodiments of the present invention, problems that arise from priority based resource allocation schemes are mitigated by introducing a new allocation state for the CCEs in the resource mapping. In exemplary embodiments of the present invention, three CCE allocation states are defined: used, unused, and alternate. The allocation states indicate whether a CCE is allocated or selected as a candidate to allocation to scheduling entities. Also, three availability states for candidate sets are also defined. The three availability states are available, unavailable, and contended. The availability state indicates whether the CCEs belonging to the set may be allocated. If all CCEs belonging to a set are unused, the set is considered as available. If any CCE belonging to a set is used, the set is considered as unavailable. If one or more CCEs belonging to a set are alternate and the remaining CCEs are unused, and allocating the CCEs in alternate state doesn't block other user terminals for which one or more of the CCEs within the set are designated as an alternate, the set is considered as contended.

In general, the resource mapping method and apparatus according to embodiments of the present invention avoid commitment to allocation of resources to a specific scheduling entity in situations where two or more candidate sets are available for the scheduling entity. A scheduling entity (SE) may comprise a user terminal or a broadcast message. In this case, the allocation state of the CCEs belonging to the candidate sets is changed to "alternate" to indicate that the CCEs are candidates for allocation to a first scheduling entity. A CCE designated as an alternate may be allocated to a second scheduling entity as long as such allocation does not block the first scheduling entity. That is, as long as the first scheduling entity has at least two candidate sets available, any CCE designated as an alternate may be allocated to the second scheduling entity.

Exemplary embodiments of the invention comprise methods for allocating control channel resources. In one exemplary embodiment, the method begins by determining shared control channel elements allocated to the downlink control channels. Each of the control channel elements has an initial allocation state of unused. Next, an availability state of one or more candidate sets for a first scheduling entity is determined based on the allocation states of the control channel elements within each candidate set. Each set comprises a subset of the control channel elements for the downlink control channels. If two or more candidate sets are available, the allocation states of the corresponding control channel elements in the available candidate sets are changed to "alternate". If only a single candidate set is available, the control channel elements within the available candidate set are allocated to the first scheduling entity and the allocation states of the control channel elements within the available candidate set are changed to "used".

Other embodiments of the invention comprise a base station in a communication network. The base station comprises a transceiver circuit for communicating with a plurality of scheduling entities and a resource mapping circuit to allocate control channel resources for sending downlink control information. The resource mapping circuit is configured to determine the shared control channel elements allocated to the control channels for the scheduled scheduling entities. Each control channel element has an allocation state of used, unused, or alternate. The resource mapping circuit is further configured to determine one or more candidate sets for a first scheduling entity, wherein each set comprises a subset of the control channel elements for the control channels, and to determine an availability state of each candidate set based on the allocation states of the control channel elements within each candidate set. The resource mapping circuit is configured to change the allocation states of the corresponding control channel elements in the available candidate sets to alternate if two or more candidate sets are available. The resource mapping circuit is further configured to allocate the control channel elements within the available candidate set to the first scheduling entity and to change the allocation state of the control channel elements within the available candidate set to used if only a single candidate set is available.

Avoiding commitment of resources to a specific scheduling entity in the early phases of the resource mapping process reduces the probability of blocking of other scheduling entities and results in more efficient allocation of control channel resources.

BRIEF DESCRIPTION OF THE DRAWINGS

FIGS. 13A-13C illustrate the reallocation of control channel elements from one scheduling entity to another.

DETAILED DESCRIPTION

Figure 1:
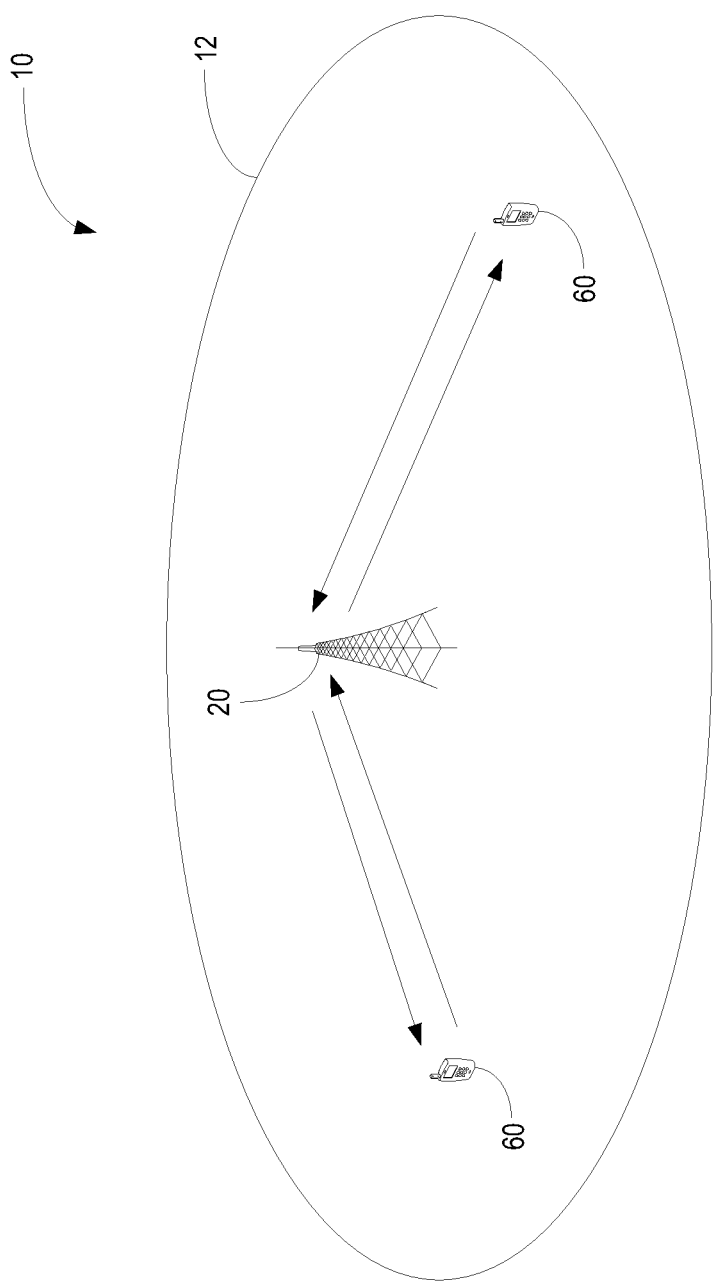
FIG. 1 illustrates an exemplary communications network.

Turning now to the drawings, FIG. 1 illustrates an exemplary communication network 10 according to one exemplary embodiment of the present invention. The communication network 10 comprises a plurality of cells 12, though only one cell 12 is shown in FIG. 1. A base station 20 within each cell 12 communicates with the user terminals 60 within each cell 12. The base station 20 transmits data to the user terminals 60 over a downlink channel for downlink communications, and receives data from the user terminals 60 over an uplink channel for uplink communications.

For illustrative purposes, an exemplary embodiment of the present invention will be described in the context of a Long Term Evolution (LTE) system. Those skilled in the art will appreciate, however, that the present invention is more generally applicable to other wireless communication systems, such as WiMAX (IEEE 802.16) systems, where scheduling of frequency resources is performed.

Figure 2:
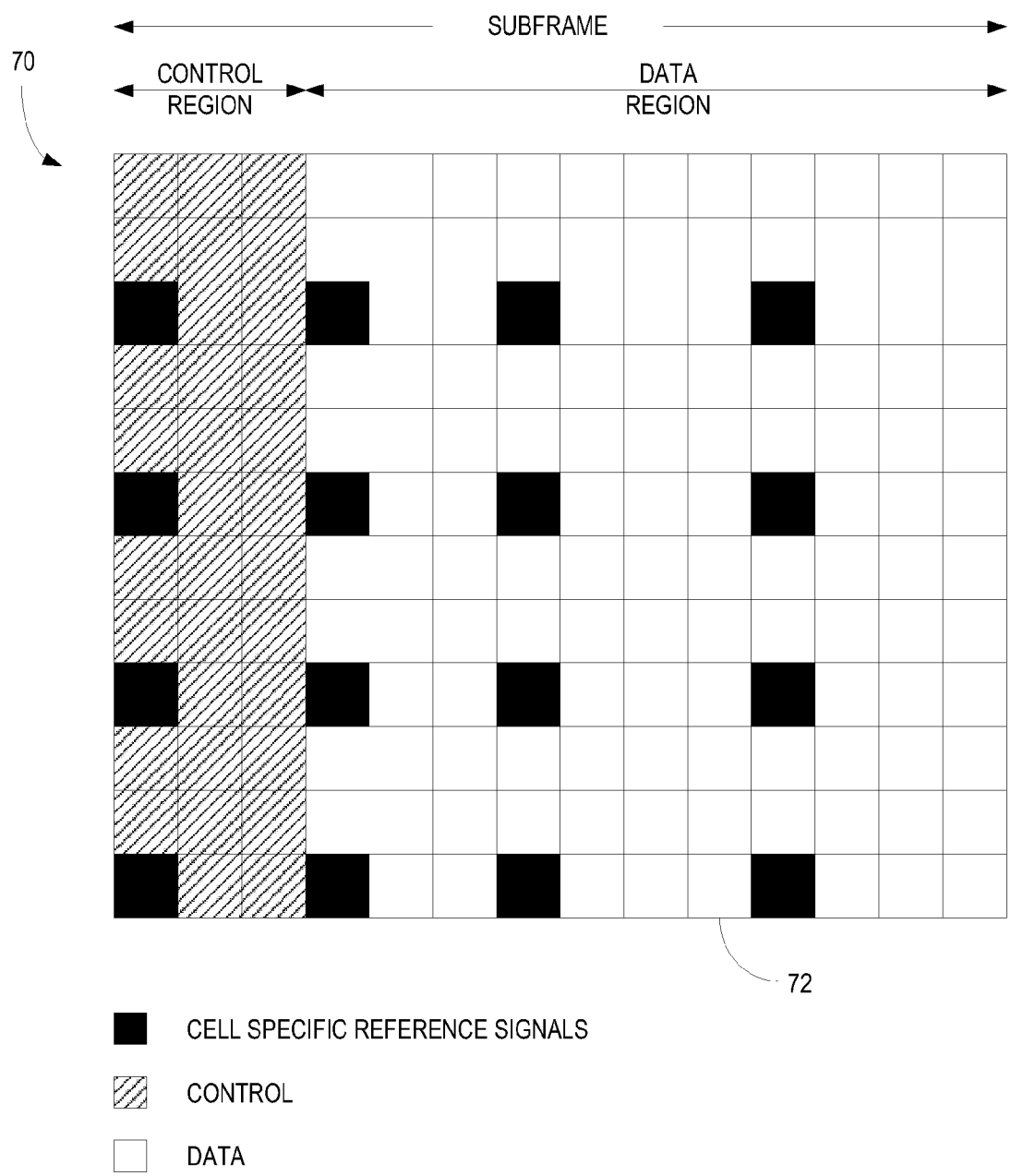
FIG. 2 illustrates a time-frequency grid for an exemplary communication system based on the Long Term Evolution (LTE) standard.

LTE uses Orthogonal Frequency Division Multiplexing (OFDM) in the downlink and Discrete Fourier Transform (DFT) spread OFDM in the uplink. The available radio resources in LTE systems can be viewed as a time-frequency grid. FIG. 2 illustrates a portion of an exemplary OFDM time-frequency grid 70 for LTE. Generally speaking, the time-frequency grid 70 is divided into one millisecond subframes. Each subframe includes a number of OFDM symbols. For a normal cyclic prefix (CP) length, suitable for use in situations where multipath dispersion is not expected to be extremely severe, a subframe comprises fourteen OFDM symbols. A subframe comprises twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 70 is a resource element 72. A resource element 72 comprises one OFDM subcarrier during one OFDM symbol interval.

Figure 3:
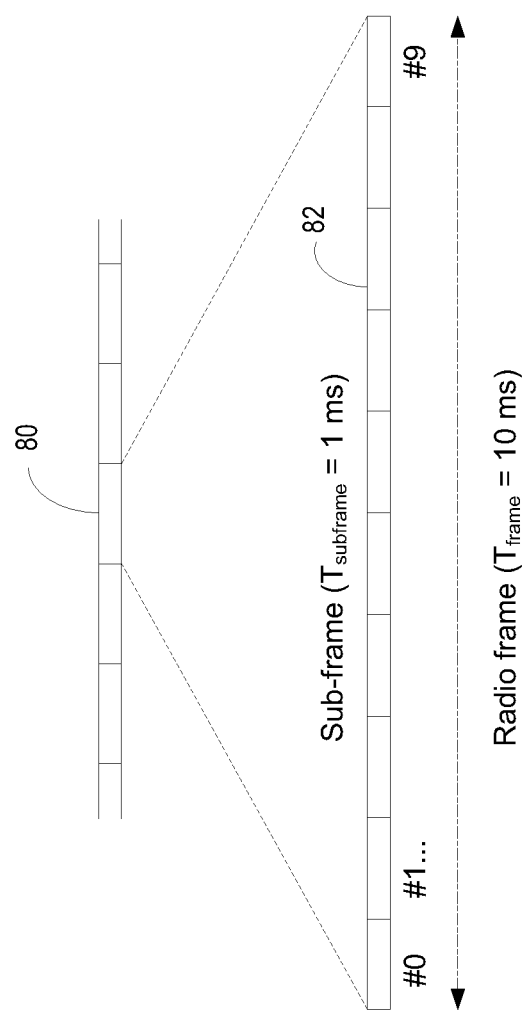
FIG. 3 illustrates an exemplary radio frame in a LTE system.

In LTE systems, data is transmitted to the user terminals 60 over a downlink transport channel known as the Physical Downlink Shared Channel (PDSCH). The downlink transmissions may comprise data transmissions to a specific user terminal 60, broadcast messages intended for all user terminals 60, or broadcast messages for a specified group of user terminals 60. The PDSCH is a time and frequency multiplexed channel shared by a plurality of mobile terminals. As shown in FIG. 3, the downlink transmissions are organized into 10 ms radio frames 80. Each radio frame comprises ten equally-sized subframes 82. For purposes of downlink scheduling, the downlink time-frequency resources are allocated in units called resource blocks (RBs). Each resource block spans twelve subcarriers (which may be adjacent or distributed across the frequency spectrum) and one 0.5 ms slot (one half of one subframe). The term "resource block pair" refers to two consecutive resource blocks occupying an entire one millisecond subframe.

During each 1 ms subframe interval, commonly referred to as a Transmission Time Interval (TTI), a scheduler for the base station 20 schedules one or more downlink transmissions on the PDSCH. The base station 20 transmits downlink control information (DCI) identifying the intended recipients of the downlink transmissions, the transmission formats used, and the resource blocks on which the data is being transmitted. The DCI is typically transmitted on the Physical Downlink Control Channel (PDCCH) in the first one, two, or three OFDM symbols (up to 4 symbols for 1.4 MHz bandwidth systems) in each subframe, which is referred to as the control region (FIG. 2). The PDCCH is a control channel used to transmit Downlink Control Information (DCI), such as assignment messages and HARQ information. Each PDCCH carries signaling for a single user terminal 60 or a specified group of user terminals 60.

Figure 4:
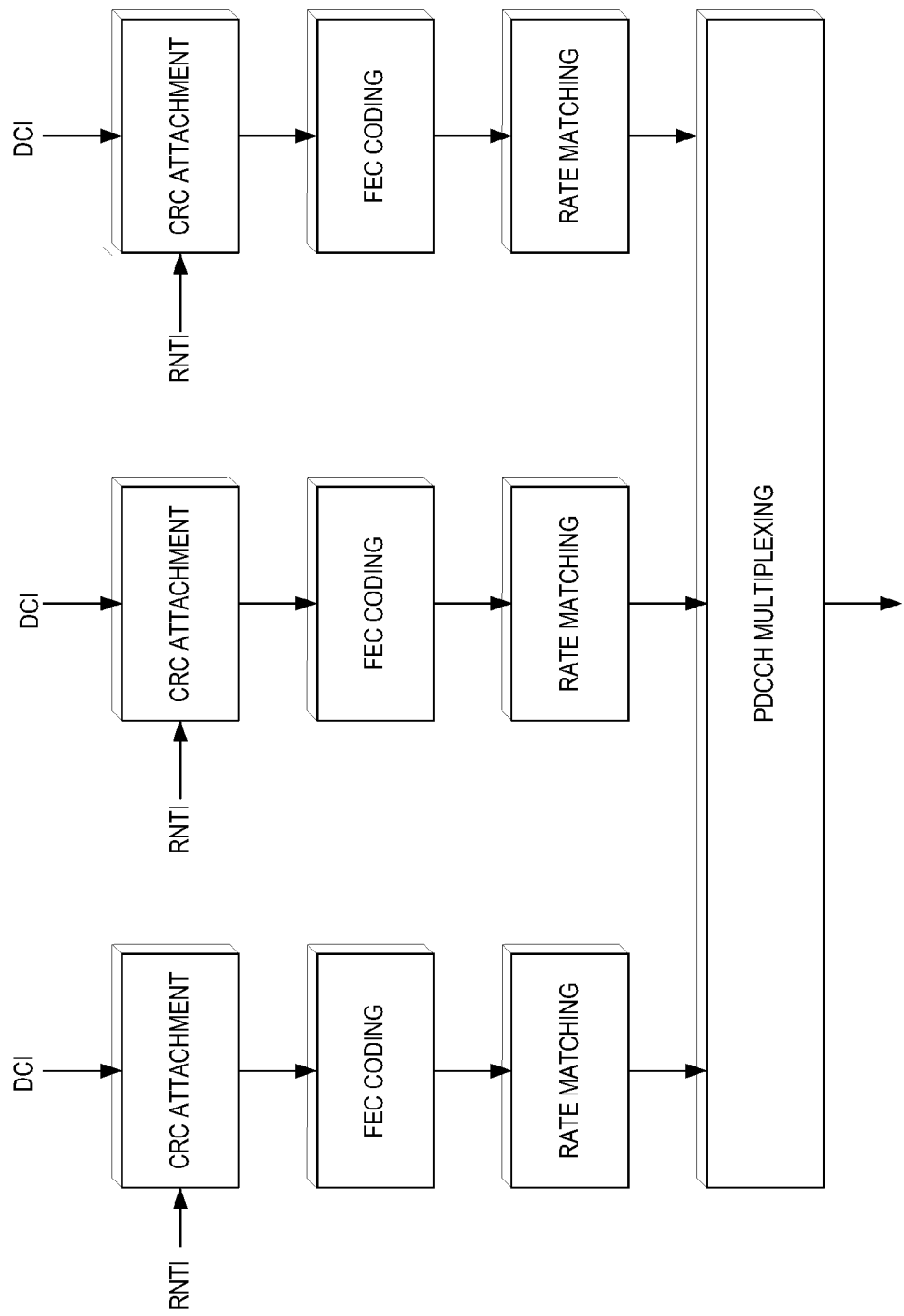
FIG. 4 illustrates PDCCH processing in an LTE system.

FIG. 4 illustrates the processing of downlink control information (DCI) for transmission on a PDCCH. A cyclic redundancy check (CRC) code is appended to each DCI message payload. The radio network terminal identifier (RNTI) of the user terminal 60 or group of user terminals 60 for which the message is intended is included in the CRC calculations. The RTNI may identify a single user terminal 60 or a group of user terminals 60. For traffic assignment messages, a terminal specific C-RNTI is used. Upon receipt of an assignment message, the user terminal 60 decodes the CRC using its own RNTI. Successful decoding indicates that the assignment message is intended for the user terminal 60. Thus, the identity of the user terminal 60 targeted to receive the DCI message is implicitly encoded in the CRC.

After CRC attachment, the bits of the DCI along with the CRC are coded with a rate one-third tail biting convolutional code. Rate matching is then performed to fit the resources for PDCCH transmission. As described in more detail below, the PDCCH resources are allocated in units referred to as control channel elements (CCEs). The PDCCH carrying the assignment message is transmitted along with other PDCCH messages. CCE aggregation and multiplexing is applied to map PDCCHs transmitted to the PDCCH resources allocated for PDCCH transmission.

A certain structure is applied to the mapping of PDCCHs to resource elements to simplify processing of the control channels by the user terminal 60. The structure is based on units referred to as control channel elements (CCEs). Depending on the amount of control information to be transmitted and the channel condition, CCEs may be aggregated into sets comprising one, two, four, or eight CCEs. The number of CCEs in a set for a given PDCCH depends on the amount of the control information and the channel coding rate. The number of CCEs in a set is referred to as the aggregation level. Varying the aggregation level is used to realize link adaptation for the PDCCH.

Figure 5:
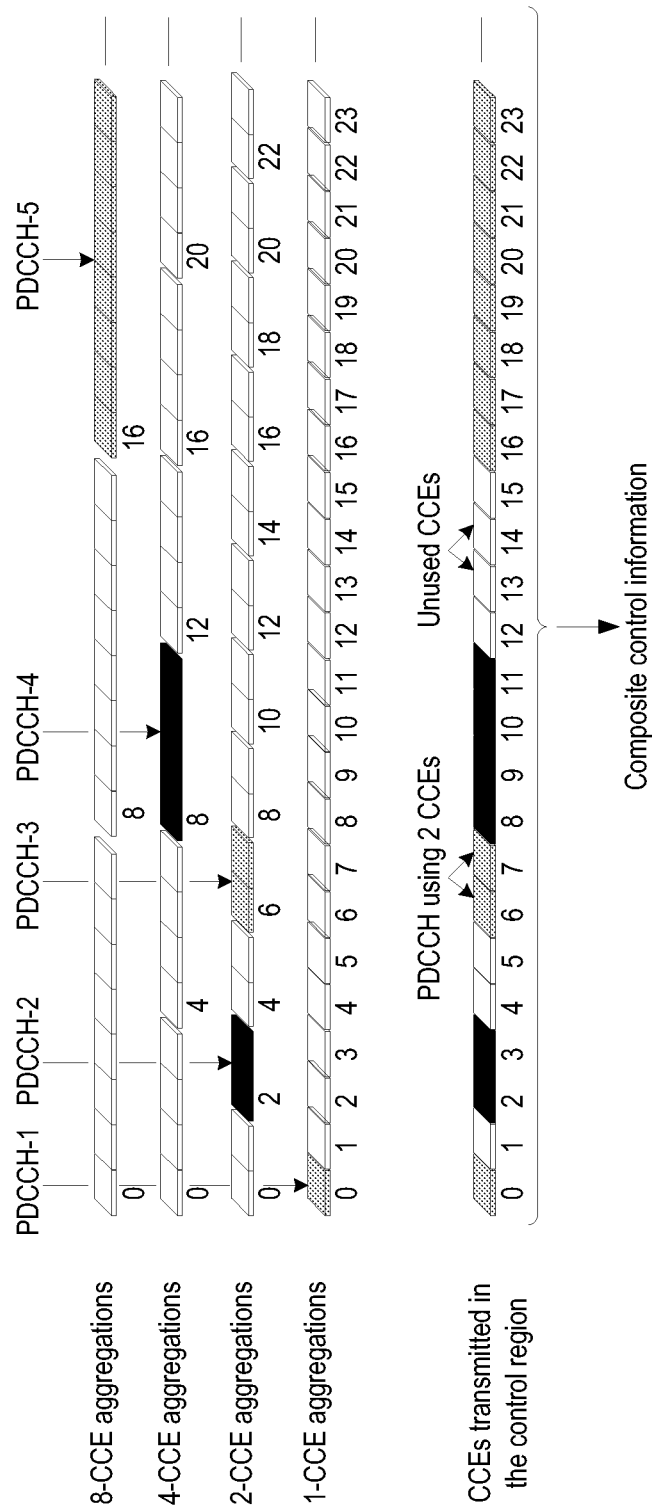
FIG. 5 illustrates CCE aggregation and PDCCH multiplexing in an LTE system.

The total number of CCEs available for all PDCCHs depends on the size of the control region, the cell bandwidth, the number of downlink antenna ports, and the amount of resources occupied by the Physical Hybrid-ARQ indicator channel (PHICH). The size of the control region can vary dynamically from one subframe to another. The size of the control region is indicated by the Physical Control Format Indicator Channel (PCFICH). Because the number of CCEs for each of the PDCCHs may vary and is not signaled, a user terminal 60 must blindly determine the number of CCEs used for the PDCCH. To simplify processing for the user terminal 60, some restrictions are applied on the aggregation of CCEs. As shown in FIG. 5, assuming that the CCEs are consecutively numbered from zero upward, a set may begin only on a CCE number evenly divisible by the aggregation level of the set. For example, a set comprising eight CCEs (aggregation level of eight) must begin on a CCE number evenly divisible by eight. The same rule applies to sets with aggregation levels of four and two.

The mapping of PDCCHs to CCEs is typically performed in order of scheduling priorities beginning with the PDCCH of the scheduling entity having the highest scheduling priority. To begin, all CCEs are marked as "unused." For each scheduling entity, the availability state of all possible sets of CCEs having the proper aggregation level, referred to herein as candidate sets, is determined. If an available candidate set is found, the CCEs in the available candidate set are allocated to the PDCCH for the scheduling entity and the allocation states of the CCEs are changed to "used." Resource mapping continues with the PDCCH for the next scheduling entity and continues until the last scheduling entity is processed.

Because the candidate sets for different scheduling entities may overlap, a scheduling entity may be blocked from receiving an allocation of CCE resources even though there is a sufficient number of available CCEs. This blocking effect can result in inefficient use of the available PDCCH resources. Further, this blocking effect may result in priority inversion where a higher priority scheduling entity is blocked from receiving an allocation of resources while a lower priority scheduling entity receives resources.

Figure 6:
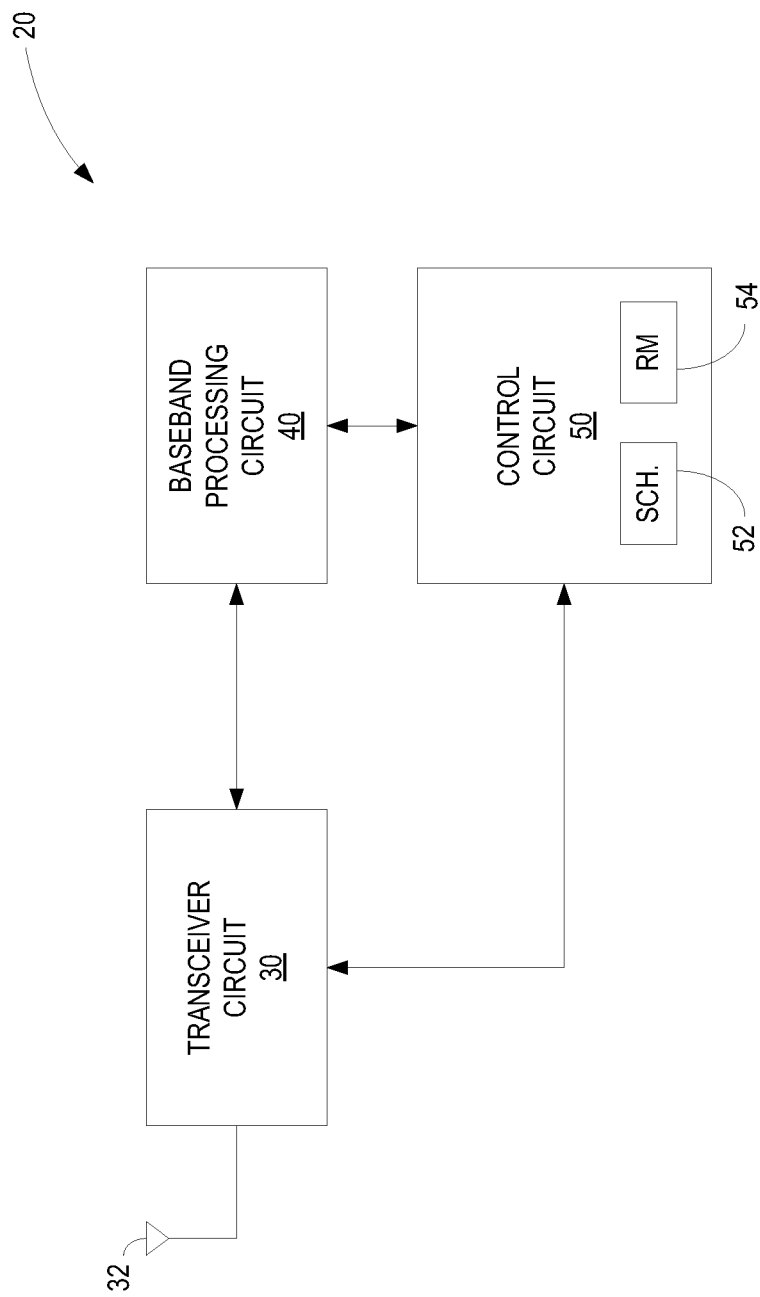
FIG. 6 illustrates an exemplary base station according to an embodiment of the present invention.

FIG. 6 illustrates the main functional components of a base station 20 involved in the scheduling of downlink and uplink transmissions and the processing of the PDCCH. The base station 20 comprises a transceiver circuit 30 coupled to one or more antennas 32, a baseband processing circuit 40, and a control circuit 50. The transceiver circuit 30 contains the radio frequency (RF) components needed for communicating with the user terminals 60 over a wireless communication channel. The baseband processing circuit 40 processes the signals transmitted or received by the base station 20, including the control information transmitted on the PDCCH. Such processing includes coding and modulation transmitted signals, and the demodulation and decoding of received signals. The control circuit 50 controls the operations of the base station 20 according to the applicable communication standard.

The control circuit 50 includes a resource mapping circuit 54 to perform resource mapping for the PDCCHs. Resource mapping includes CCE aggregation and PDCCH multiplexing as shown in FIG. 4. The control circuit 50 includes a scheduler 52 for scheduling transmission downlink and/or uplink transmissions. The baseband processing circuit 40 and control circuit 50 may comprise one or more processors, hardware, firmware, or a combination thereof.

In exemplary embodiments of the present invention, many of the problems that arise from priority based resource allocation schemes are avoided by introducing a new allocation state for the CCEs in the resource mapping. In exemplary embodiments of the present invention, three CCE allocation states are defined: used, unused, and alternate. A "used" CCE is one that has been finally allocated to a PDCCH. An "alternate" CCE is one that has been tentatively allocated to a PDCCH, but not committed. An "unused" CCE is one that has not been allocated or tentatively allocated to a PDCCH. As hereinafter described, the additional CCE allocation state enables the resource mapping circuit 54 to avoid commitment of CCEs when multiple candidate sets are available for a given scheduling entity.

Also, three availability states for candidate sets are also defined. The three availability states are available, unavailable, and contended. The availability state is an attribute of a candidate set and indicates whether the CCEs belonging to the set may be allocated. A candidate set is unavailable if any one of its CCEs is used. A set is available if all of its CCEs are unused. A set is contended if none of its CCEs are used, but at least one CCE is tentatively allocated for any PDCCH, and allocating the CCEs in alternate state doesn't block other competing scheduling entities for which one or more of the CCEs within the CCE set are designated as alternate.

In general, the mapping circuit 54 in embodiments of the present invention avoids commitment to allocation of resources to a specific scheduling entity in situations where two or more candidate sets are available for the scheduling entity. In this case, the CCEs belonging to the candidate sets are tentatively allocated and the allocation states of the CCEs are changed to "alternate." A CCE designated as an alternate may be "reallocated" to another scheduling entity as long as such allocation does not block the first scheduling entity. That is, as long as the first scheduling entity has at least two candidate sets that are available, any CCE designated as an alternate may be allocated to another scheduling entity.

The basic rules applied by the mapping circuit 54 for allocation of CCEs are as follows:

1. When only one candidate set is available, allocate its CCEs to the scheduling entity and change the allocation state to "used."
2. When two or more candidate sets are available, tentatively allocate the CCEs in the available candidate sets and change the allocation states of the CCEs to "alternate."
3. When no candidate sets are available but at least one candidate set is contended, alternate CCEs in a contended candidate set may be reallocated to the scheduling entity. The allocation state of the reallocated CCEs is changed to "used" or "alternate" depending on whether the reallocation is final or tentative. The allocation states of "orphaned" CCEs are changed to "unused."
4. When a CCE in a contended candidate set is "reallocated", determine the number of available candidate sets for the scheduling entity affected by the reallocation. If only a single candidate set is available after the reallocation, allocate the CCEs in the remaining candidate set to the affected scheduling entity and change the allocation state of the CCEs to used.

Figure 7:
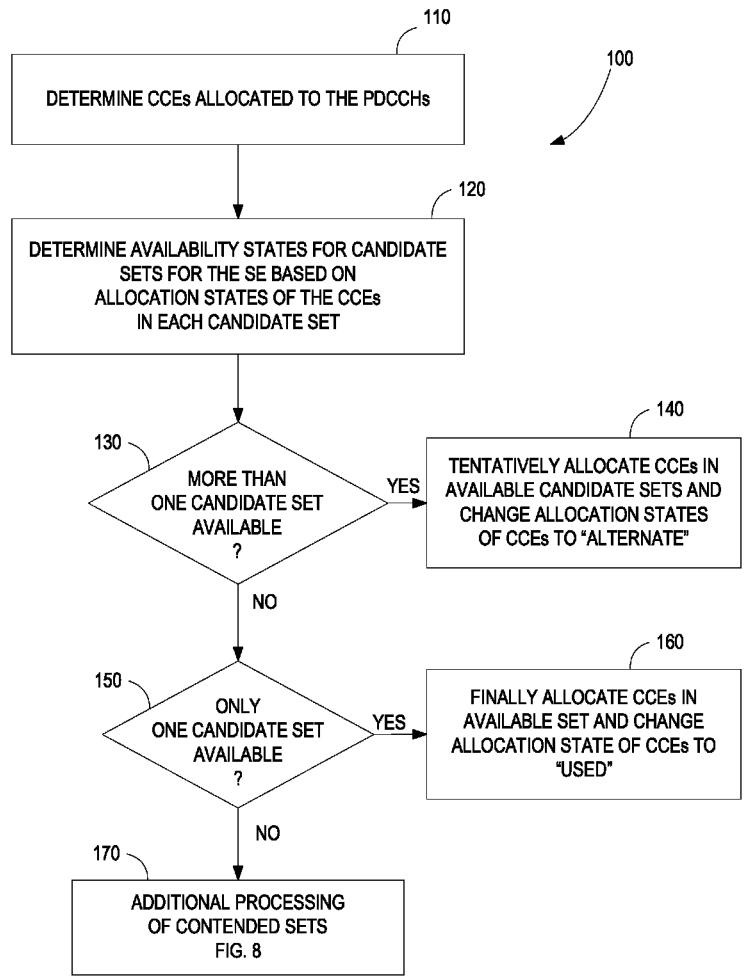
FIG. 7 illustrates an exemplary method of allocating control channel resources according to one exemplary embodiment.

FIG. 7 illustrates a resource mapping procedure 100 for allocating resources to the PDCCH for a scheduling entity according to one exemplary embodiment. To begin the resource mapping procedure, the resource mapping circuit 54 determines the CCEs allocated to the downlink control channels, the PDCCHs (block 110). The resource mapping circuit 54 determines the availability states for one or more candidate sets for the scheduling entity based on the allocation states of the CCEs in the sets (block 120). The resource mapping circuit 54 then determines the number of available candidate sets (blocks, 130, 150). If more than one candidate set is available, the resource mapping circuit 54 tentatively allocates the CCEs for the available candidate sets to the scheduling entity and changes the allocation states of the CCEs to alternate (block 140). If only one candidate set is available, the resource mapping circuit 54 allocates the CCEs in the available candidate set and changes the allocation states of the corresponding CCEs to used (block 160). If no sets are available, additional processing may be performed in some embodiments to determine whether the CCEs in a contended set may be allocated to the scheduling entity (block 170).

Figure 8:
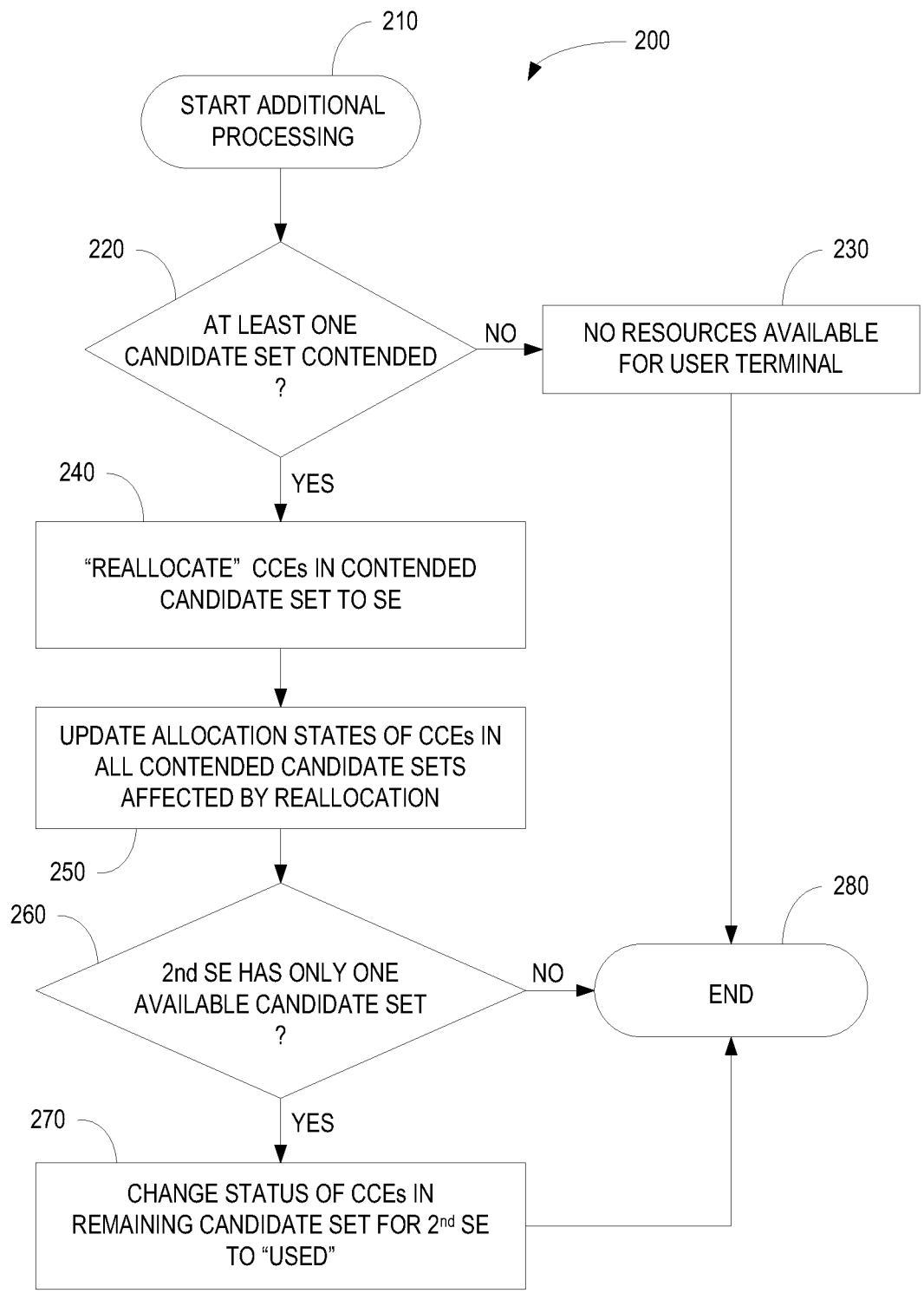
FIG. 8 illustrates an exemplary procedure for allocating contended resources used in the resource allocation method of FIG. 6.

FIG. 8 illustrates additional processing that may be performed for contended resources when no sets are available for a given scheduling entity. The additional processing is triggered (block 210) when it is determined that no candidate sets are available for the scheduling entity. When additional processing is triggered, the resource mapping circuit 54 determines whether any candidate sets are contended (block 220). If not, the resource mapping circuit 54 determines that no resources are available (block 230) and the procedure ends (block 280). If at least one candidate set is contended, the resource mapping circuit 54 selects one of the contended candidate sets, and "reallocates" CCEs in the contended candidate set (block 240). The selection of the contended set may be based on factors such as the number of alternate CCEs in a contended set, the number of candidate sets impacted by the reallocation, the number of scheduling entities affected by the reallocation, or a combination thereof. If CCEs in a contended set are "reallocated", the resource mapping circuit 54 updates the allocation state of CCEs in all contended candidate sets affected by the reallocation (block 250). At block 260, the resource mapping circuit 54 determines the number of available candidate sets for the affected scheduling entities (block 260). If the affected scheduling entity has only one available candidate set the resource mapping circuit 54 changes the allocation state of the CCEs in the available candidate set to used (block 270) and the procedure ends (block 280). If the affected scheduling entity has more than one available candidate set, the procedure ends (block 280).

The "reallocation" of CCEs in a contended candidate set (block 240) may be tentative or final. When a contended candidate set is selected, it overlaps with other candidate sets tentatively allocated to other scheduling entities. In this case, CCEs in the previously tentatively allocated candidate sets that are affected by the reallocation are no longer available to the scheduling entities that received the original tentative allocation. The allocation states of these CCEs are first changed to "unused". Because the change of allocation state of these CCEs may affect other contended candidate sets of the scheduling entity that receives a reallocation, other contended candidate set may become available in addition to the selected contended set. The resource mapping circuit 54 may re-check the availability state of other contended sets that are affected by the reallocation. If more than one originally contended set becomes available, the allocation states of the CCEs in the newly available candidate sets are changed to "alternate" (block 250). If only one originally contended set becomes available, the allocation states of the CCEs in the newly available candidate set are changed to "used" (block 250). A simpler (but sub-optimal) approach is not to re-check the availability state of other contended sets, and just change the allocation state of the CCEs in the selected contended set to "used".

The resource mapping procedures outlined in FIGS. 7 and 8 avoids commitment of control channel resources to a specific scheduling entity as long as more than one candidate set is available. Avoiding commitment of resources in the early phases of the resource mapping process reduces the probability of blocking of other scheduling entities. Instead of finally committing the resources, the resources are identified as alternate candidates for the scheduling entity. CCEs identified as alternate candidates for a first scheduling entity may subsequently be allocated to a second scheduling entity unless the allocation to the second scheduling entity would block the first scheduling entity from receiving an allocation.

Figure 9:
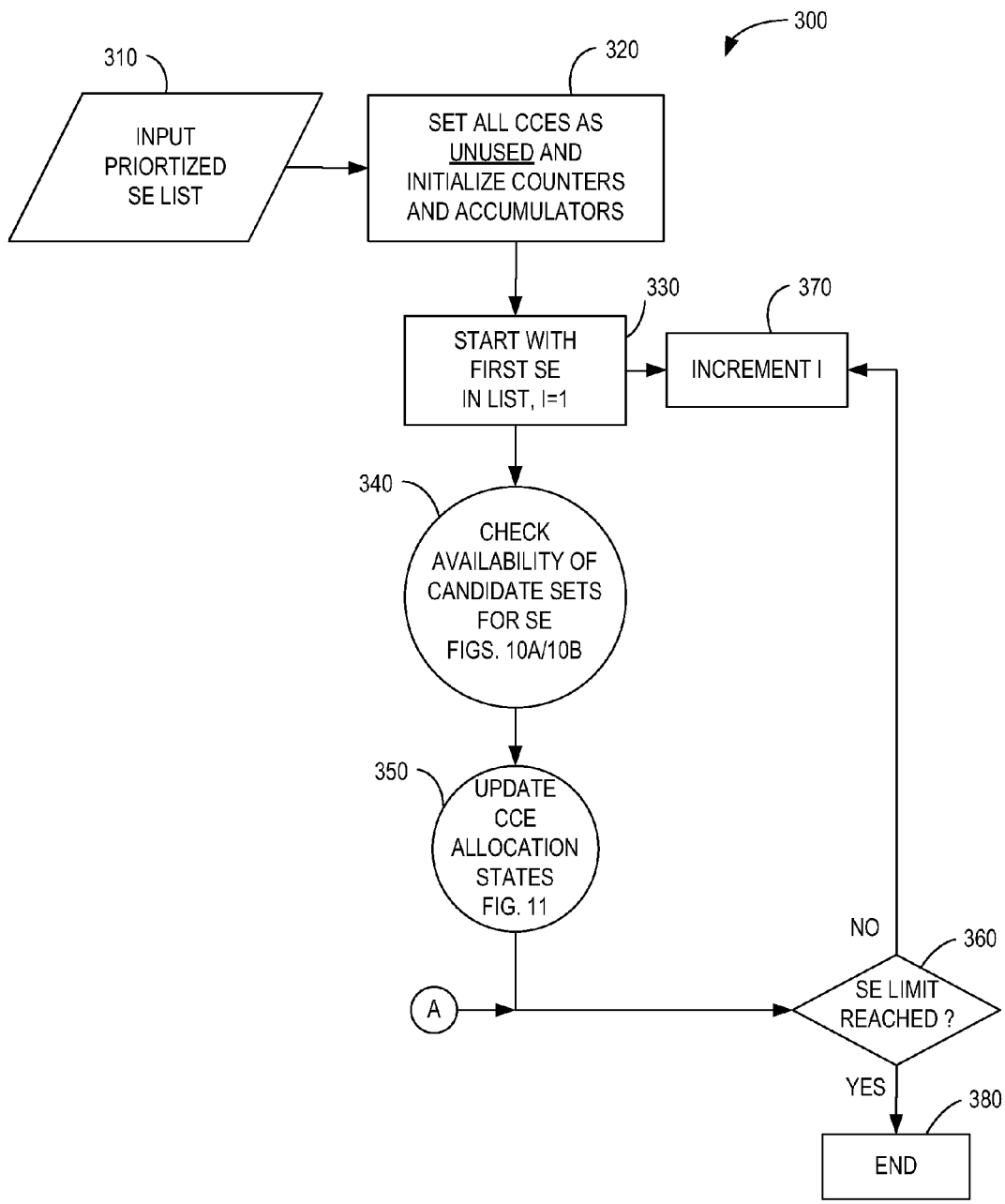
FIG. 9 illustrates an exemplary method of allocating control channel resources according to one exemplary embodiment.

FIG. 9 illustrates a detailed procedure 300 for resource allocation according to one exemplary embodiment. To start the procedure 300, a list of scheduling entities are input to the resource mapping circuit 54 (block 310). The list identifies the scheduling entities in order of priority. The resource mapping circuit 54 sets the states for all CCEs allocated to the PDCCHs as "unused" and initializes its counters (block 320). The resource mapping circuit 54 then selects the first scheduling entity in the list to begin the resource mapping (block 330). The resource mapping circuit 54 checks the availability of the candidate sets for the selected scheduling entity (block 340) and updates the CCE states for the candidate sets as hereinafter described (block 350). In some embodiments, a limit may be set for the number of SEs that may be scheduled in a subframe. After processing each scheduling entity, the resource mapping circuit 54 checks whether the limit has been reached (block 360). If so, the process ends (block 380). If not, the resource mapping circuit 54 increments the SE counter and processing continues with the next scheduling entity (block 370).

Figure 10A:
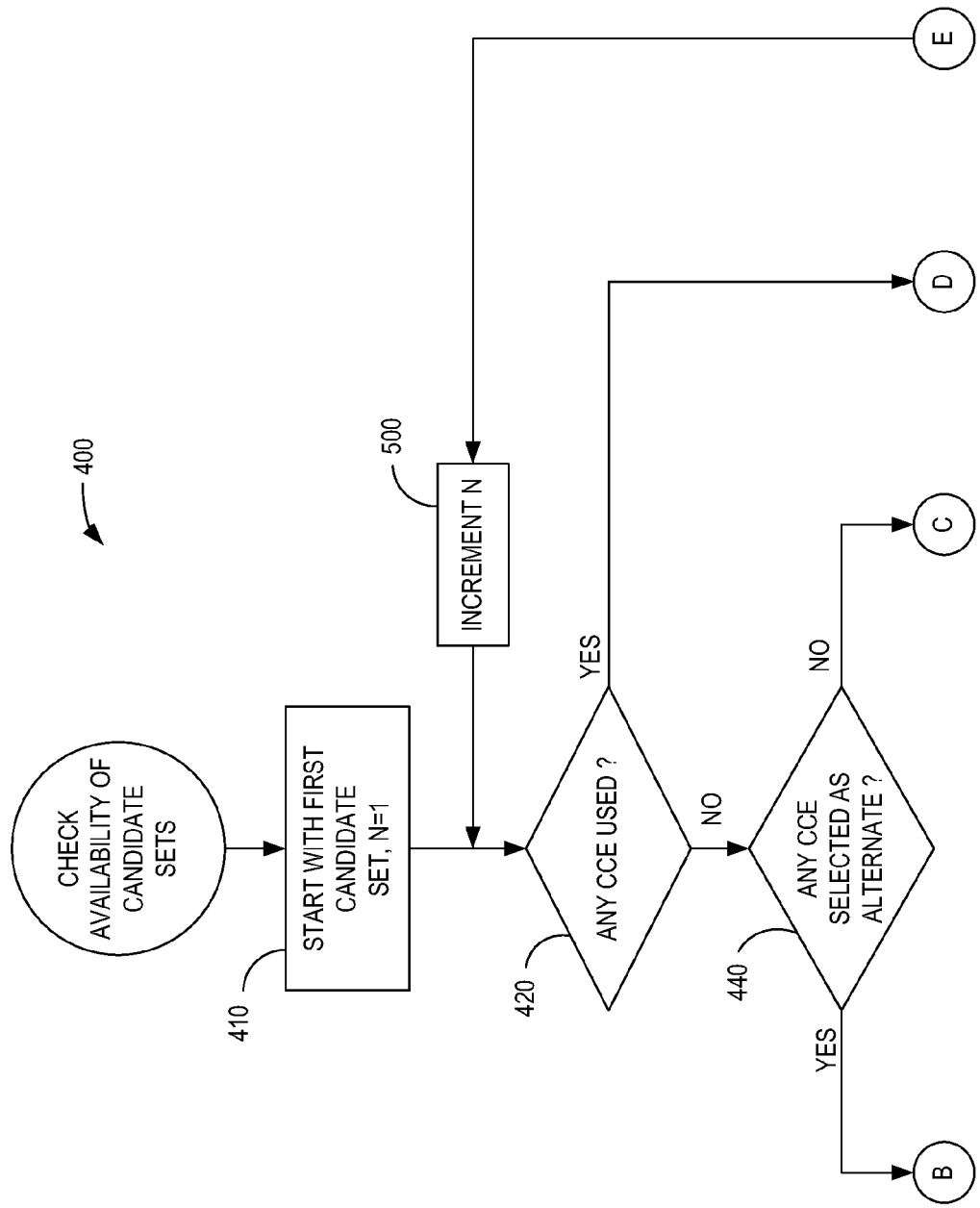
FIGS. 10A and 10B illustrate an exemplary procedure for checking the availability of resource used in the allocation method of FIG. 8.
Figure 10B:
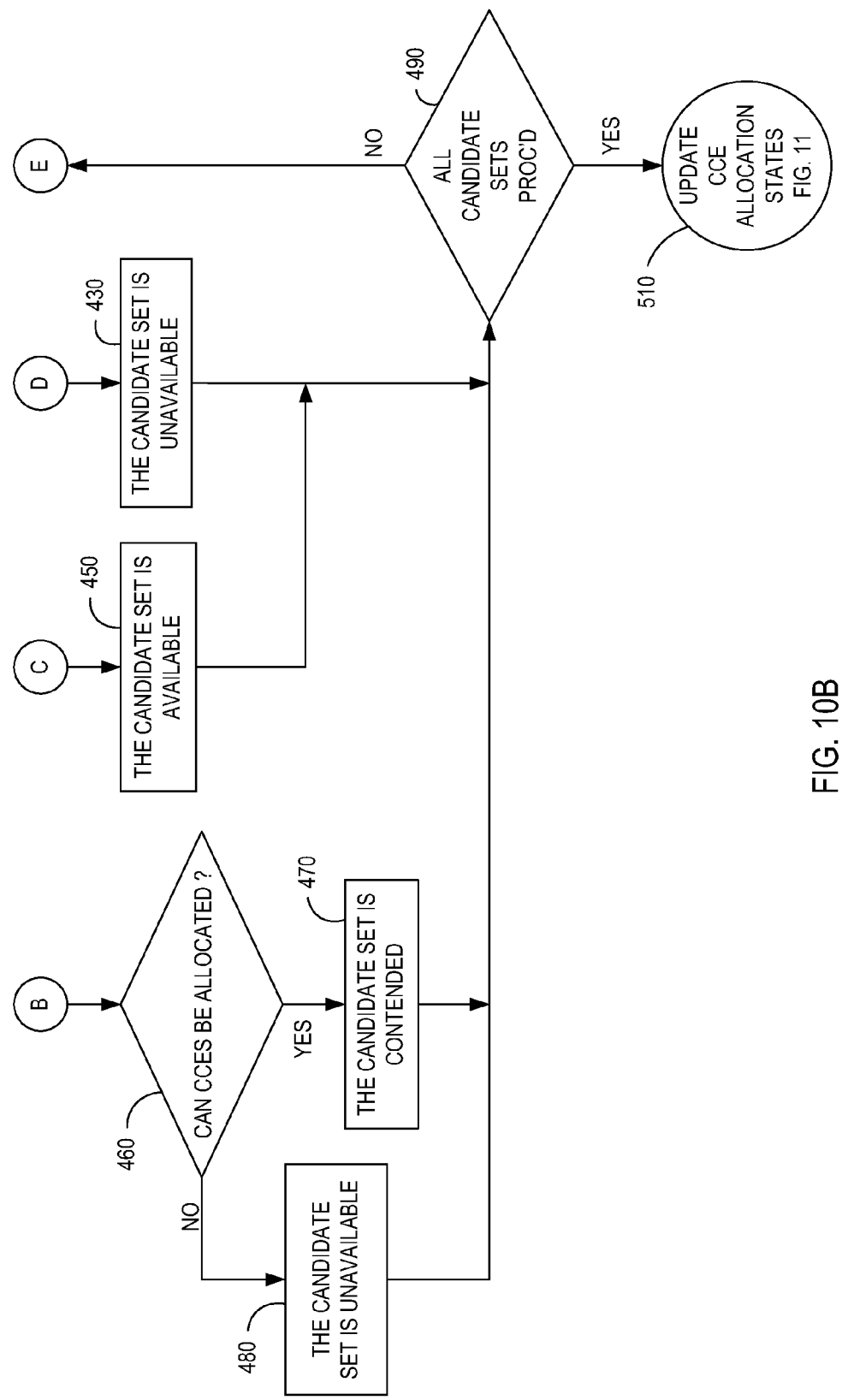

FIGS. 10A and 10B illustrate a procedure 400 for checking the availability of all candidate sets for a given scheduling entity performed at block 340 in FIG. 9. The resource mapping circuit 54 selects the first candidate set (n=1) (block 410). The resource mapping circuit 54 then determines whether any control channel elements in the candidate set are used (block 420). If so, the availability state for the candidate set is set to unavailable (block 430). If not, the resource mapping circuit 54 checks whether any CCE has been selected as alternate (block 440). If not, the availability state of the candidate is set to available (block 450). If any CCEs are selected as alternate, the resource mapping circuit 54 determines whether the CCEs can be allocated (block 460). As previously described, an alternate CCE may be allocated unless the allocation would block the allocation of resources to the scheduling entity for which the CCE is designated as an alternate. If the alternate CCEs can be allocated, the availability state of the candidate set is set to contended (block 470). If the alternate CCEs cannot be allocated, the availability state of the candidate set is set to unavailable (block 480). After each candidate is processed, the resource mapping circuit 54 determines whether any more candidates need processing (block 490). If so, the resource mapping circuit 54 increments its candidate counter (block 500) and processing continues as previously described (block 420 through 480). If no more candidates require processing, then processing proceeds with the updating of the allocation state of the CCEs (block 510).

Figure 11:
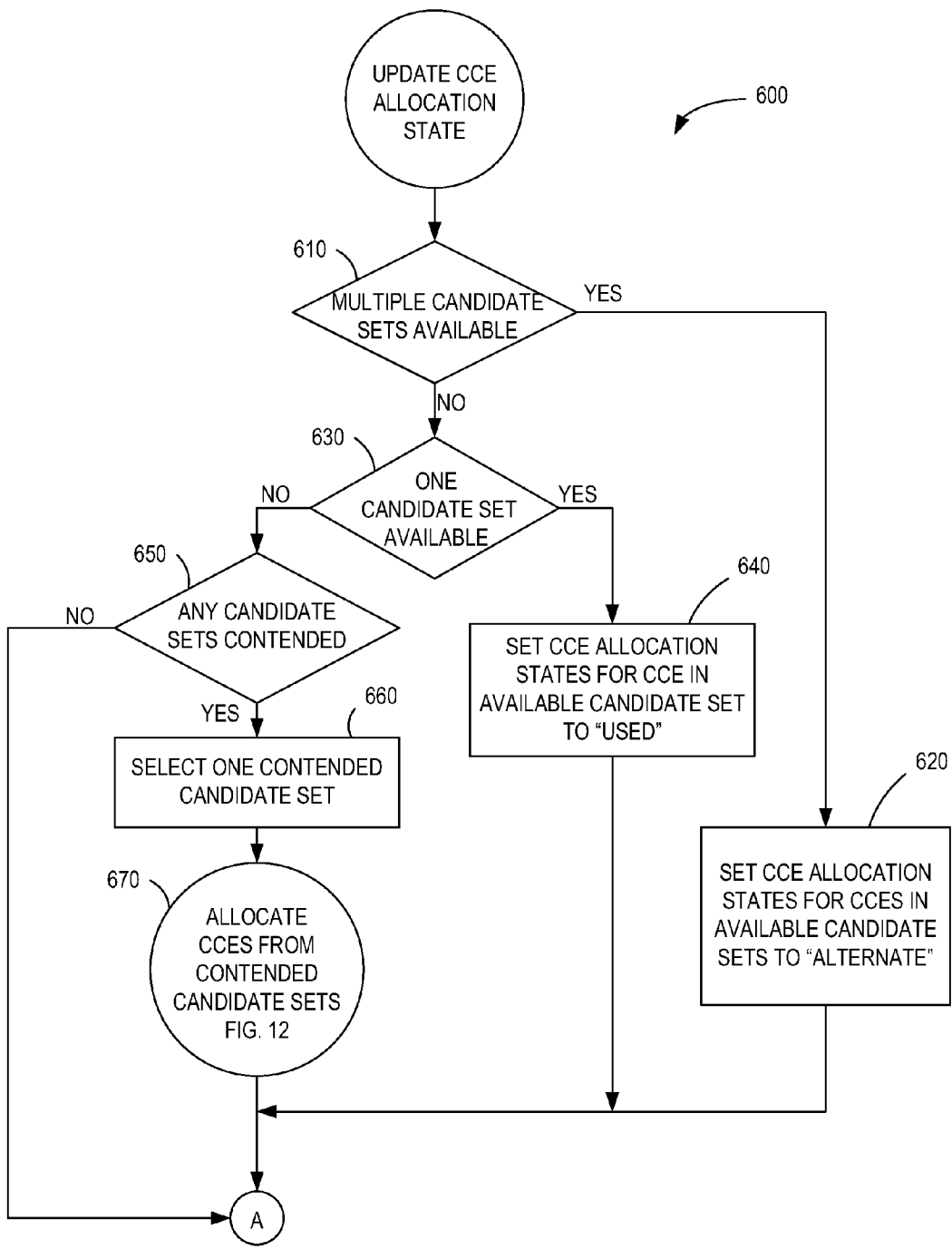
FIG. 11 illustrates an exemplary procedure for updating the allocation state of control channel elements used in the allocation method of FIG. 8.

FIG. 11 illustrates a procedure 600 for updating the allocation states of the CCEs. The procedure 600 shown in FIG. 11 is performed during the processing of each scheduling entity. The resource mapping circuit 54 determines the number of candidate sets available for the scheduling entity (blocks 610, 630). If the resource mapping circuit 54 determines that multiple candidate sets are available (610), the resource mapping circuit 54 sets the allocation state to alternate for all CCEs in the available candidate sets (block 620). If the resource mapping circuit 54 determines that only one candidate set is available (block 630), the resource mapping circuit 54 sets the allocation states to used for all CCEs in the available candidate set (block 640). If no candidate sets are available, the resource mapping circuit 54 determines if any candidate set are contended (block 650). If so, the resource mapping circuit 54 selects one of the contended candidate sets (block 660) and reallocates the CCEs from the selected candidate to the current scheduling entity being processed (block 670). The selection of the contended candidate set can be based on different criteria. It can be based on the number of CCEs in the "alternate" state in a contended candidate set, or the number of impacted candidate sets, or the number of impacted scheduling entities, or some combination of these factors. If no candidate sets are contended, no resources can be allocated to the scheduling entity. The processing continues with the next scheduling entity.

Figure 12A:
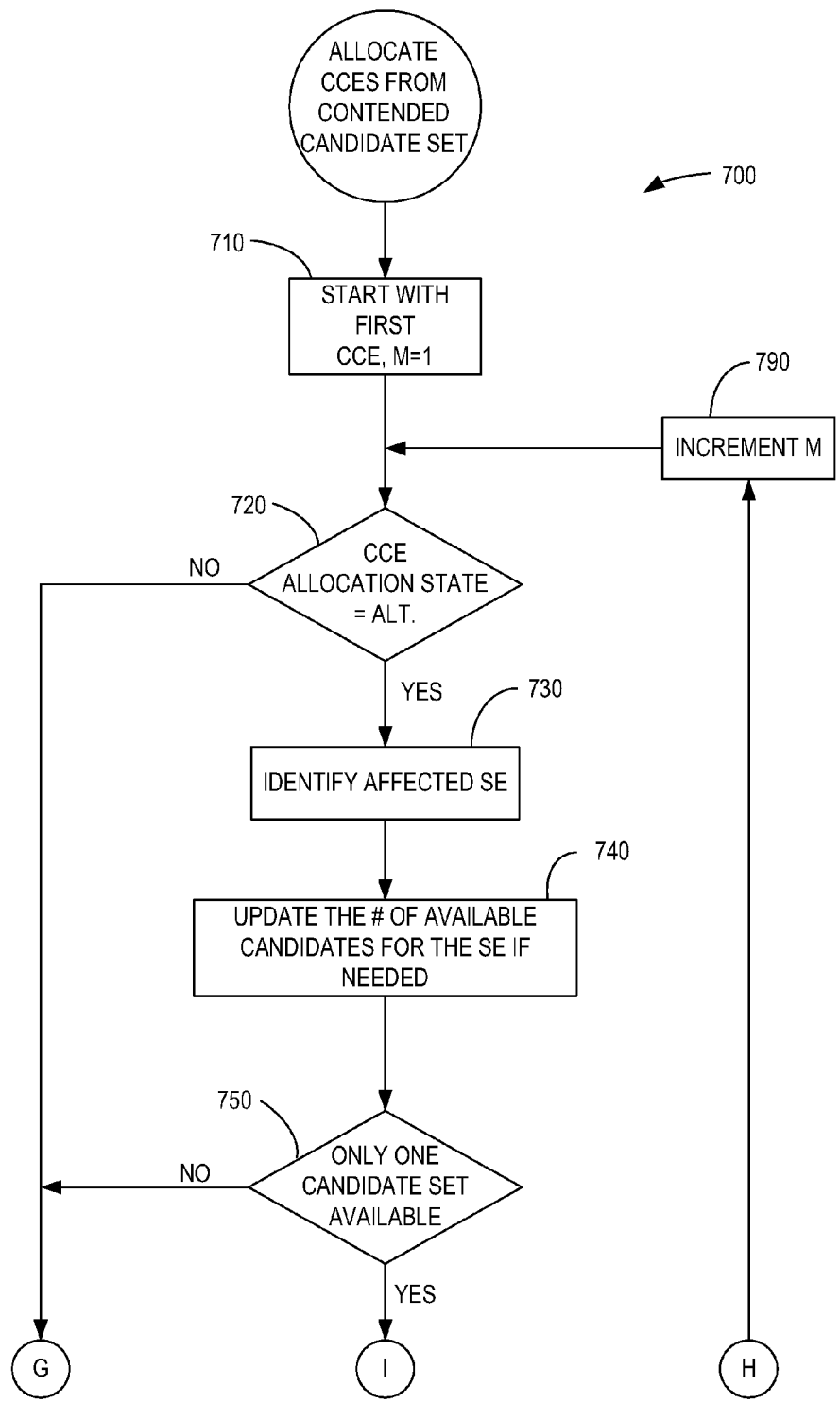
FIGS. 12A and 12B illustrate an exemplary procedure for allocating contended resources used in the resource allocation method of FIG. 8.
Figure 12B:
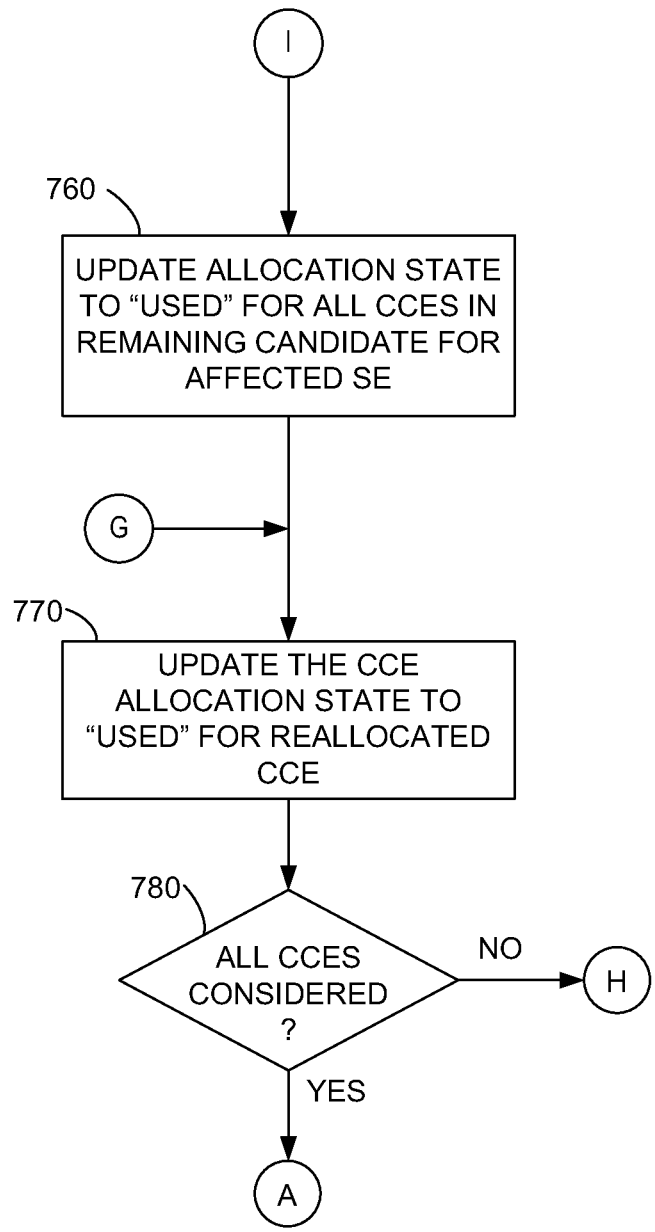

FIGS. 12A and 12B illustrate an exemplary procedure for allocating CCEs in a contended candidate set. Processing begins with the first CCE in the contended set (m=1) (block 710). The resource mapping circuit 54 checks the allocation state for the CCE (block 720). If the allocation state is set to alternate, the resource mapping circuit 54 identifies the competing scheduling entity affected by the allocation (block 730). The competing scheduling entity is the one for which the CCE is selected as an alternate. The resource mapping circuit 54 also identifies the candidate set to which the CCE originally belongs, and changes the allocation state of all CCEs in the original candidate set to unused. The resource mapping circuit 54 then updates the number of available candidate sets for the competing scheduling entity (block 740). If only one candidate is available (block 750) the resource mapping circuit 54 updates the CCE allocation state for all CCEs in the remaining candidate set to "used" (block 760) The resource mapping circuit 54 then updates the allocation state for the reallocated CCE to "used" (block 770). After the CCE is processed, the resource mapping circuit 54 determines if all CCEs have been considered (block 780). If not, the CCE counter is incremented (block 790) and processing continues as previously described with the next CCE (block 720 through 770). When all CCEs have been processed, the processing returns to the update procedure shown in FIG. 10.

It may be observed that the reallocation of CCEs in a contended candidate set at step 670 in FIG. 11 may result in certain previously tentatively allocated CCEs being unusable by the scheduling entity to which the CCEs were originally allocated. Referring to FIG. 13A, assume that CCE numbers 0-7 were tentatively allocated to a first scheduling entity as a candidate set with aggregation level of 8 and that CCEs 0-3 and 4-7 form two contended candidate sets with aggregation level of 4 for a second scheduling entity. CCEs 0-3 may be reallocated at step 670 to the second scheduling entity. This means that CCEs 4-7 can no longer be used by the first scheduling entity, since eight consecutive CCEs are needed. As indicated above, the allocation states of these "orphaned" CCEs should also be changed to "unused." Please note that "O" and "X" in the figure indicate the CCE is unused or used, respectively.

In some embodiments of the invention, the revised allocations states of the "orphaned" CCEs may be considered in determining what type of allocation is made to the current scheduling entity. Continuing with the previous example, it is noted that when CCEs 4-7 are changed to "unused," then the second scheduling entity has two available candidate sets: one comprising CCEs 0-3 and one comprising CCEs 4-7. Therefore, the resource mapping circuit 54 may, in some embodiments, recheck the availability of adjacent contended candidate sets affected by a reallocation. As seen in FIG. 13B, if the reallocation also makes the adjacent candidate set available, then the CCEs in all the newly available candidate sets can be tentatively allocated rather than finally allocated. In this example, the allocation states of CCEs 0-7 are changed to "alternate."

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of allocating control channel resources at a transmitter, the control channel resources being allocated to a plurality of scheduling entities, said method comprising:
    determining shared control channel elements allocated to the downlink control channels for the scheduling entities, wherein each control channel element has an allocation state of used, unused, or alternate;
    determining an availability state of one or more candidate sets for a first scheduling entity based on the allocation states of the control channel elements within each candidate set, wherein each set comprises a subset of said control channel elements for the downlink control channels;
    if two or more candidate sets are available, tentatively allocating the control channel elements in the two or more available candidate sets to the first scheduling entity by changing the allocation states of the corresponding control channel elements in the available candidate sets to alternate; and
    if only a single candidate set is available, finally allocating the control channel elements within the available candidate set to the first scheduling entity by changing the allocation state of the control elements within the single available candidate set to used; and
    transmitting from the transmitter the allocated control channel elements over the downlink control channels.

2. The method of claim 1 wherein determining an availability state of each candidate set comprises:
    determining the allocation states for one or more of the control channel elements within the candidate set, and
    determining the availability state for candidate set based on the allocation states for the one or more control channel elements within the candidate set.

3. The method of claim 2 wherein determining the allocation states for one or more of the control channel elements in the candidate set comprises:
    determining that the allocation state is used when the control channel element is finally allocated to another scheduling entity;
    determining that the allocation state is alternate when the control channel element is tentatively allocated to another scheduling entity; and
    otherwise determining that the allocation state is unused.

4. The method of claim 1 wherein the availability state comprises available, unavailable, and contended.

5. The method of claim 4 wherein determining an availability state of each candidate set comprises:
    determining that a candidate set is available when the allocation state of all control channel elements is unused;
    determining that a candidate set is unavailable when the allocation state of at least one of its control channel elements is used; and
    determining that a candidate set is contended when the allocation state of one or more of its control channel elements is alternate and the allocation state of the remaining control channel elements is unused, and allocating the control channel elements in alternate state doesn't block other competing scheduling entities for which one or more of the control channel elements within the candidate set are designated as alternate.

6. The method of claim 1 further comprising:
    when no candidate sets are available, determining whether any candidate sets are contended; and
    reallocating control channel elements within one or more of said contended candidate sets to the first scheduling entity.

7. The method of claim 6 wherein reallocating control channel elements within one or more of the contended candidate sets comprises finally allocating the control channel elements in one of said contended candidate sets and changing the allocation state of the reallocated control channel elements to used.

8. The method of claim 6 wherein reallocating control channel elements within one or more of the contended candidate sets comprises tentatively allocating control channel elements in two or more of said contended candidate sets and changing the allocation state of the reallocated control channel elements to alternate.

9. The method of claim 6 further comprising selecting the contended candidate sets from which control channel elements are reallocated based on a number of alternate control channel elements in a contended candidate set, a number of impacted candidate sets, a number of impacted scheduling entities, or a combination thereof.

10. The method of claim 6 further comprising:
    determining a remaining number of available candidate sets for a second scheduling entity after allocation of the control channel elements in the contended set to the first scheduling entity; and
    if only one candidate set is available for the second scheduling entity, changing the allocation state of the control channel elements in the one remaining available candidate set for the second scheduling entity to used.

11. A base station in a wireless communication network, said base station comprising:
    a transceiver circuit for communicating with a plurality of scheduling entities; and
    a resource mapping circuit to allocate shared control channel resources to the scheduling entities, said resource mapping circuit configured to:
        determine the shared control channel elements allocated to the control channels of the scheduling entities, wherein each control channel element has an allocation state of used, unused, or alternate;
        determine one or more candidate sets for a first scheduling entity, wherein each set comprises a subset of said control channel elements for the control channels;
        determine an availability state of each candidate set based on the allocation states of the control channel elements within each candidate set;
        if two or more candidate sets are available, tentatively allocate the control channel elements to the first scheduling entity by changing the allocation states of the corresponding control channel elements in the two or more available candidate sets to alternate; and
        if only a single candidate set is available, finally allocate the control channel elements within the available candidate set to the first scheduling entity by changing the allocation state of the control elements within the available candidate set to used.

12. The base station of claim 11 wherein the resource mapping circuit is configured to determine an availability state of each candidate set by:
- determining the allocation states for one or more of the control channel elements within the candidate set, and
- determining the availability state for candidate set based on the allocation states for the one or more control channel elements within the candidate set.

13. The base station of claim 12 wherein the resource mapping circuit is configured to determine the allocation states for one or more of the control channel elements in the candidate set by:
- determining that the allocation state is used when the control channel element is finally allocated to another scheduling entity;
- determining that the allocation state is alternate when the control channel element is tentatively allocated to another scheduling entity; and
- otherwise determining that the allocation state is unused.

14. The base station of claim 11 wherein the resource mapping circuit is configured to determine the availability state for each candidate set as one of available, unavailable, and contended.

15. The base station of claim 14 wherein the resource mapping circuit is configured to determine an availability state of each candidate set by:
- determining that a candidate set is available when the allocation state of all control channel elements is unused;
- determining that a candidate set is unavailable when the allocation state of at least one of its control channel elements is used; and
- determining that a candidate set is contended when the allocation state of one or more of its control channel elements is alternate and the allocation state of the remaining control channel elements is unused, and allocating the control channel elements in alternate state doesn't block other competing scheduling entities for which one or more of the control channel elements within the candidate set are designated as alternate.

16. The base station of claim 15 wherein the resource mapping circuit is configured to:
- when no candidate sets are available, determine whether any candidate sets are contended; and
- reallocate control channel elements within one or more of said contended sets to the first scheduling entity.

17. The base station of claim 16 wherein the resource mapping circuit is further configured to finally allocate the control channel elements in one of the contended candidate sets and to change the allocation states of the reallocated control channel elements to used.

18. The base station of claim 16 wherein the resource mapping circuit is further configured to tentatively allocate the control channel elements in two or more of the contended candidate sets and to change the allocation state of the reallocated control channel elements to alternate.

19. The base station of claim 16 wherein the resource mapping circuit is further configured to select the contended candidate sets from which control channel elements are reallocated based on a number of alternate control channel elements in a contended candidate set, a number of impacted candidate sets, a number of impacted scheduling entities, or a combination thereof.

20. The base station of claim 16 wherein the resource mapping circuit is configured to:
- determine a remaining number of available candidate sets for the second scheduling entity after allocation of the control channel elements in the contended set to the first scheduling entity; and
- if only one candidate set is available for the second scheduling entity, change the allocation state of the control channel elements in the one remaining available candidate set for the second scheduling entity to used.

* * * * *